(12) United States Patent
Heisler et al.

(10) Patent No.: US 12,545,192 B2
(45) Date of Patent: Feb. 10, 2026

(54) SENSOR ASSEMBLY FOR A WORK VEHICLE

(71) Applicant: AGCO International GmbH, Neuhausen (CH)

(72) Inventors: Robert Heisler, Marktoberdorf (DE); Klaus-Jürgen Satzger, Marktoberdorf (DE); Theo Vogler, Marktoberdorf (DE); Christian Roberto Kelber, Marktoberdorf (DE); Erich Freytag, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 86 days.

(21) Appl. No.: 18/578,077

(22) PCT Filed: Jun. 22, 2022

(86) PCT No.: PCT/IB2022/055782
§ 371 (c)(1),
(2) Date: Jan. 10, 2024

(87) PCT Pub. No.: WO2023/002271
PCT Pub. Date: Jan. 26, 2023

(65) Prior Publication Data
US 2024/0317147 A1    Sep. 26, 2024

(30) Foreign Application Priority Data
Jul. 21, 2021   (GB) ..................................... 2110456

(51) Int. Cl.
*B60R 11/04*   (2006.01)
*B60R 11/00*   (2006.01)

(52) U.S. Cl.
CPC ......... *B60R 11/04* (2013.01); *B60R 2011/004* (2013.01); *B60Y 2200/22* (2013.01)

(58) Field of Classification Search
CPC .............. B60R 11/04; B60R 2011/004; B60Y 2200/22; G01S 13/86; G01S 7/027;
(Continued)

(56) References Cited

U.S. PATENT DOCUMENTS 7,472,466 B2    1/2009   Myers et al.
10,514,303 B2   12/2019  Krishnan et al.
(Continued)

FOREIGN PATENT DOCUMENTS

CN    106945612 A    7/2017
CN    207000331 U    2/2018
(Continued)

OTHER PUBLICATIONS

UK Intellectual Property Office, Search Report for GB Application No. GB2110456.7, dated Apr. 13, 2022, 4 pages.
(Continued)

*Primary Examiner* — Sath V Perungavoor
*Assistant Examiner* — Tyler B Edwards

(57) ABSTRACT

A sensor assembly for an agricultural work vehicle includes a housing, one or more sensor units mounted or otherwise supported by the housing, one or more fixation points for coupling the housing to a roof assembly of the agricultural work vehicle, and an electrical interface providing an electrical connection between the one or more sensor units and one or more electrical systems of the agricultural work vehicle.

24 Claims, 5 Drawing Sheets

(58) Field of Classification Search
CPC ...... G01S 7/521; G01S 15/931; G01S 13/862; G01S 13/865; G01S 13/867; G01S 15/86; G01S 2013/9323; G01S 2013/9324; G01S 2013/3273; G01S 13/931; B62D 25/06; B62D 33/0617
See application file for complete search history.

(56) References Cited

U.S. PATENT DOCUMENTS

| | | | |
|---|---|---|---|
| 2018/0265019 A1* | 9/2018 | Dry | B60R 16/0231 |
| 2019/0248421 A1* | 8/2019 | Jacobsthal | B62D 25/06 |
| 2019/0315409 A1 | 10/2019 | Ghannam et al. | |
| 2020/0292679 A1* | 9/2020 | Osiroff | G01S 7/4816 |

FOREIGN PATENT DOCUMENTS

| | | |
|---|---|---|
| CN | 109532696 B | 2/2021 |
| GB | 2553651 A | 3/2018 |
| JP | 2020196319 A | 12/2020 |

OTHER PUBLICATIONS

European Patent Office, Search Report for PCT Application No. PCT/IB2022/055782, dated Sep. 20, 2022, 15 pages.

\* cited by examiner

SENSOR ASSEMBLY FOR A WORK VEHICLE

CROSS REFERENCE TO RELATED APPLICATIONS

This application is a national phase entry under 35 U.S.C. § 371 of International Patent Application PCT/IB2022/055782, filed Jun. 22, 2022, designating the United States of America and published in English as International Patent Publication WO 2023/002271 A1 on Jan. 26, 2023, which claims the benefit of the filing date of U. K. Patent Application 2110456.7 "A Sensor Assembly for a Work Vehicle," filed Jul. 21, 2021, the entire disclosure of which is incorporated herein by reference.

TECHNICAL FIELD

The present disclosure relates, in general, to a sensor assembly for a work vehicle, and in particular for agricultural work vehicles.

BACKGROUND

In order to provide additional functionality for work vehicles, including automated features, it is necessary to incorporate additional sensing equipment and the like into the vehicle. In some examples this may include incorporating an automation package which may contain many types of sensors (e.g. cameras, LIDAR, RADAR, etc.), communication devices, antennas, GNSS receivers, electronic control units as well as light and sound devices for external human machine interaction installed on or as part of the vehicle.

Due to positioning and installation space considerations, such sensor packages are generally installed in, on or about the roof of the vehicle, however, this introduces a number of difficulties.

To provide sufficient space to install all necessary components in the roof of the vehicle, a higher and larger roof would be required. However, this may mean the vehicle becomes too tall for transportation, or require additional consideration when route-planning, due to additional height-clearance requirements. It can also introduce additional complexities in the manufacturing and assembly process.

A further consideration relates to retrofitting of automation packages onto existing work vehicles, where sufficient space may not be available and/or where assembly or installation of the necessary sensing or like components would be complex.

It would be advantageous to provide an assembly which overcomes or at least partially addresses one or more problems discussed herein.

BRIEF SUMMARY

A sensor assembly for an agricultural work vehicle comprises a housing; one or more sensor units mounted or otherwise supported by the housing; one or more fixation points for coupling the housing to a roof assembly of the agricultural work vehicle; and an electrical interface providing an electrical connection between the one or more sensor units and one or more electrical systems of the agricultural work vehicle.

Advantageously, the sensor assembly is able to be mounted to a roof assembly of an agricultural work vehicle and provide sensing capabilities through the provision of the one or more sensor units electrically connected to electrical system(s) of the work vehicle. This may allow for the retrofitting of the sensor unit(s) to such work vehicles.

The sensor units may include one or more of: a camera; a LIDAR unit; a RADAR unit; an ultrasonic sensing unit; and an infrared sensor. The assembly may include one or more of multiple sensing unit types, which may include multiple sensor units of the same type. For example, in some embodiments the sensor assembly comprises two or more LIDAR units.

The electrical interface may comprise a data interface via which data may be exchanged between the one or more sensor units and the one or more electrical systems of the work vehicle. For example, sensor data from the one or more sensor units may be transferred to a control unit associated with an electrical system of the work vehicle via the data interface.

The electrical interface may comprise a power interface via which power may be provided to the one or more sensing units from a power source associated with the work vehicle. The power source may comprise an energy storage device of the work vehicle, such as a battery.

The sensor assembly may include multiple electrical interfaces, for example a data interface and a power interface, or may comprise a single interface providing both a data and power connection between the sensor unit(s) and the one or more electrical systems of the work vehicle.

The sensor assembly may include one or more additional electrical components. The one or more additional electrical components may be connectable to one or more electrical systems of the work vehicle via the electrical interface, or via one or more additional electrical interfaces provided as part of the sensor assembly. The one or more additional electrical components may include a communication module, which may comprise part of a Global Navigation Satellite System (GNSS) for providing position information for the assembly, one or more transmitter, receiver or transceiver components, including antenna(s), an electronic control unit (ECU), a lighting module including one or more light sources, and/or an audio unit including one or more speakers.

The housing may define an enclosure for one or more of the sensor(s) and/or one or more additional electrical components. In other embodiments the housing comprises a supporting frame. The supporting frame may include one or more elongate members defining a structure on or to which the one or more sensor units and/or additional electrical components may be mounted or otherwise coupled. In embodiments, one or more sensor units may be mounted (at least partly) within an elongate member of the supporting frame, such that the member defines an enclosure for the sensor unit.

The frame may be adjustable. The frame may be adjustable to adjust a distance between each of two or more fixation points. Advantageously, the sensor assembly may be configured such that it may be coupled to roof assemblies of different sizes. Alternatively, the frame may be fixed in dimensions, but the position of one or more of the fixation points on the frame may be moveable to adjust the distance between the fixation points.

The fixation point(s) may comprise any suitable means for coupling the housing to a roof assembly of an agricultural work vehicle, and the disclosure is not limited in this sense. By way of example, the fixation points may include one or more of a bolt, clip or other suitable mechanical connection. The fixation point(s) may be configured in a manner to allow a user to couple and/or uncouple the sensor assembly from a roof assembly, and for example may include a user interaction surface which may be used by a user to, for example, turn, pull or push the fixation point (or component(s) thereof) to engage or disengage any coupling between the sensor assembly and a roof assembly of an agricultural work vehicle.

The one or more sensing units may be moveable with respect to the housing. The one or more sensing units may be moved vertically, laterally and/or longitudinally with respect to a forward direction of an agricultural work vehicle to which the sensor assembly is mounted. The one or more sensing units may be rotatable with respect to the housing, about one or more degrees of freedom.

The housing may comprise one or more moveable parts. For example, where the housing comprises a frame, the frame may comprise two or more parts which are moveable with respect to one another. This may be such that the width, length and/or height of the frame can be adjusted through movement of the frame parts. In some embodiments, the frame may comprise a fixed central portion with a pair of moveable side portions. The moveable side portions may be provided in a first sliding fit arrangement with the fixed central portion such that they may move, such as outwardly and inwardly, with respect to the fixed central frame portion to adjust a width of the frame. In further embodiments, at least one of the movable side portions may comprise a main portion and an end portion. The end portion may be moveable with respect to the main portion. The end portion may be provided in a second sliding fit arrangement with the main portion such that the end portion may be moved with respect to the main portion in a direction substantially orthogonal to the movement direction of the first sliding fit arrangement.

One or more of the sensor units may be mounted on a moveable part of the frame. The moveable part of the frame may be moved laterally, longitudinally or vertically with respect to one or more further parts of the frame. The moveable part of the frame may be rotated with respect to one or more further parts of the frame. Advantageously, the moveable part of the frame may be provided to allow adjustment of the position of the respective sensor unit(s) about one or more degrees of freedom. The moveable part of the frame may be moved manually by a user, or may be provided with a drive unit, e.g. an electrical drive unit for moving the moveable part of the frame under instruction from a control unit of the assembly, for example.

The one or more sensing units may comprise a positioning device, e.g. an electronically controlled positioning device, for controlling the position and/or orientation of a sensing element of the respective sensor unit with respect to the housing. The positioning device may be configured to control the position of the sensing element in dependence on the type of agricultural work vehicle to which the sensor assembly is mounted. This information may be determined in dependence on data received via the electrical interface, or may be determined in dependence on a manual input by a user of the vehicle, for example. Advantageously, the disclosed sensor assembly may be operable to automatically adjust the position of sensing element(s) of the one or more sensor units such that they are suitably positioned for a particular work vehicle type.

An operating characteristic of the one or more sensing units may be adjustable in dependence on the type of agricultural work vehicle to which the sensor assembly is mounted. As discussed herein, this information may be received via the electrical interface, or may be input manually by a user of the vehicle, for example. The type of agricultural vehicle may include information indicative of the dimensions of the vehicle, the tire configuration (twin vs. standard tires, tracked, etc.), the power output of the vehicle, etc.

The operating characteristic may comprise any one or more of: selection of a specific sensor filter; activation or deactivation of a particular sensor or sensing unit; adjustment in the field of view of the sensor; or an adjustment of the optics of the camera, e.g. a zoom factor.

An operating characteristic of the one or more additional electrical components may be adjustable in dependence on the type of agricultural vehicle to which the sensor assembly is mounted, which may include activating or deactivating one or more of the additional electrical component(s) in dependence on the vehicle type.

In some embodiments, there is provided an agricultural work vehicle, comprising a roof assembly comprising one or more fixation locations configured to receive respective fixation points for mounting the sensor assembly disclosed above.

Another embodiment includes an agricultural work vehicle comprising a roof assembly, with the sensor assembly mounted thereto.

The agricultural work vehicle of any preceding aspect may comprise a tractor, or a harvesting machine, such as a combine harvester, a sprayer, a forage harvester or any type of a self-propelled agricultural machine.

Within the scope of this disclosure it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the accompanying drawings, in which.

DETAILED DESCRIPTION

Figure 1A:
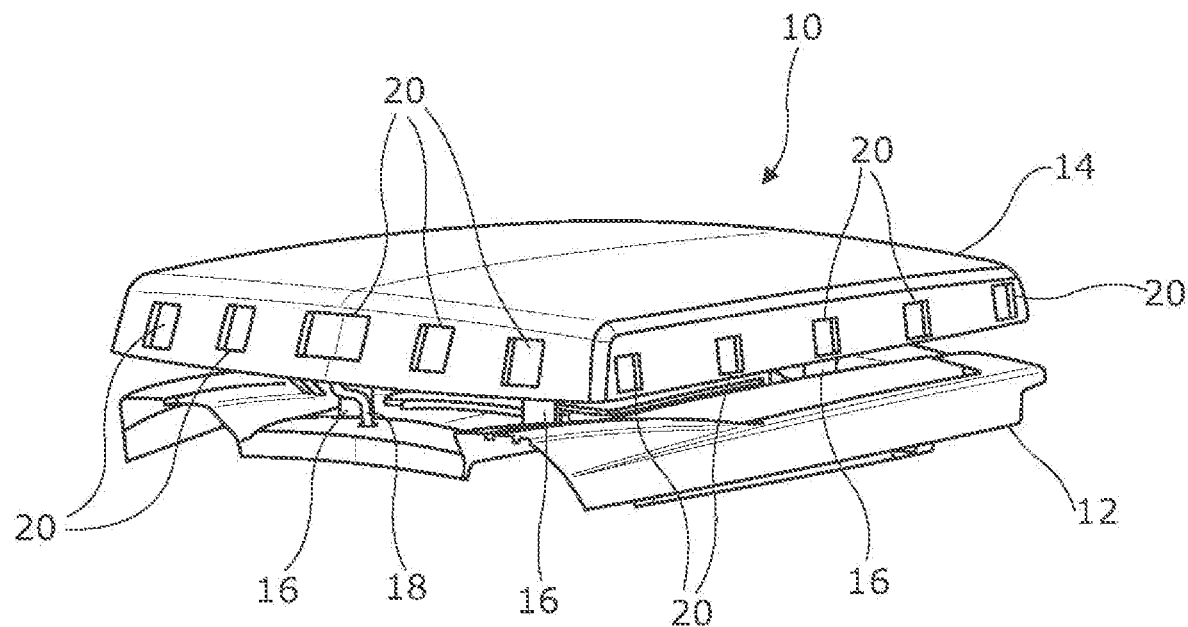
FIG. 1A is a perspective view of a first embodiment of a sensor assembly.
Figure 1B:
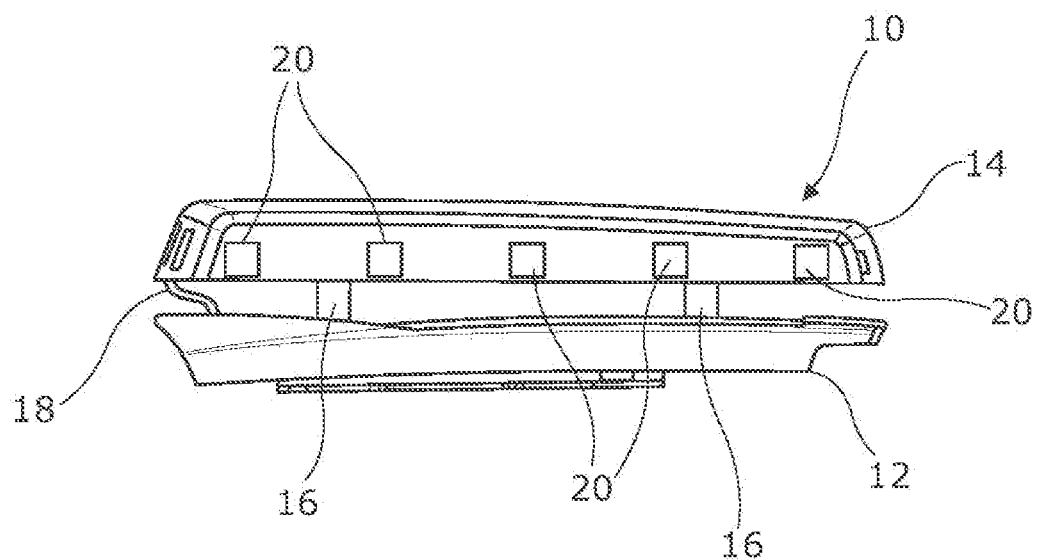
FIG. 1B is a side view of the sensor assembly of FIG. 1A.
Figure 5:
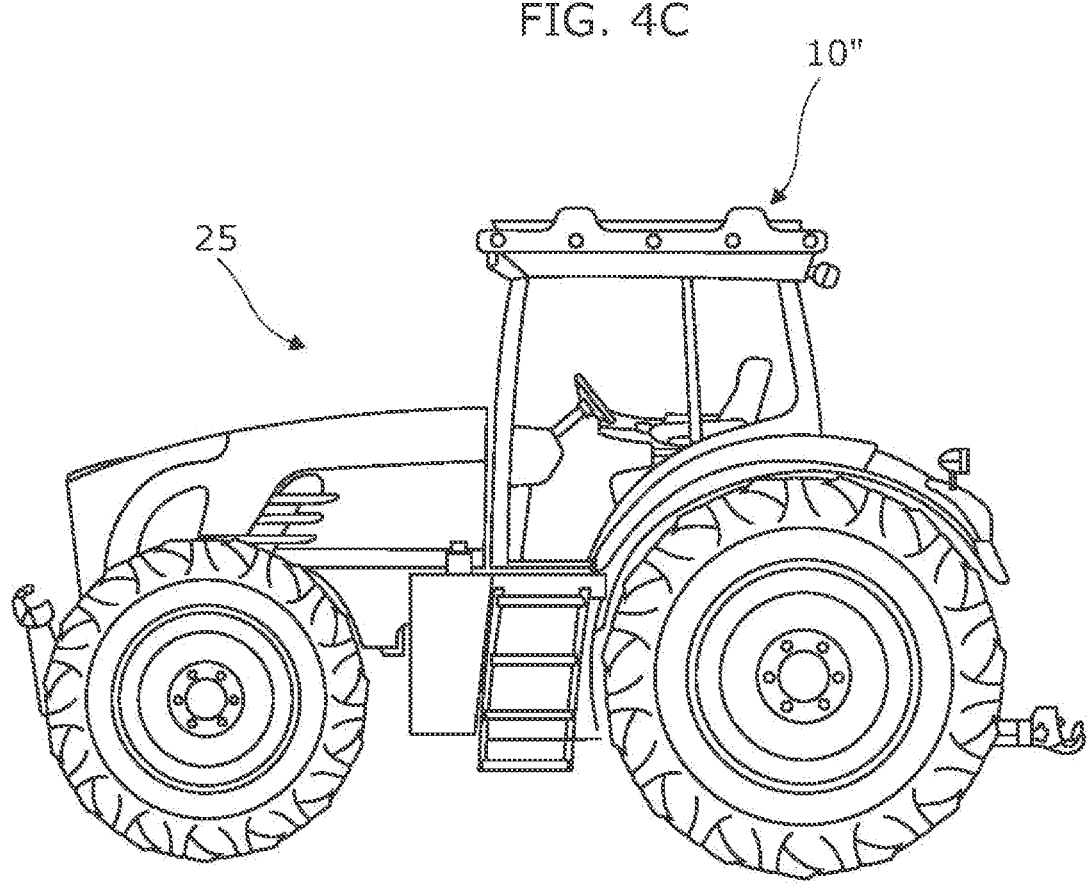
FIG. 5 is a side view of an agricultural work vehicle having a sensor assembly mounted thereto.

FIGS. 1A and 1B illustrate a first embodiment of a sensor assembly 10 mounted on a roof assembly 12 of an agricultural work vehicle, which in the illustrated embodiment is a tractor 25 (FIG. 5).

The sensor assembly 10 comprises a housing in the form of an enclosure 14 which, as described herein, houses a plurality of sensor units 20. Advantageously, the sensor assembly 10 may be mounted to the roof assembly 12 and electrically connected to one or more electrical systems of the tractor 25 to enhance the sensing capabilities of the tractor 25, which in turn may enable the provision of additional automated and/or user assistance systems on the tractor 25. The enclosure 14 provides coverage for the sensor units 20 and/or one or more additional electrical components (see below) which may also be provided as part of the sensor assembly 10.

Sensor assembly 10 includes a plurality of fixation points in the form of mechanical joints 16 configured to be received at corresponding fixation locations (not shown) in the roof assembly 12. The roof assembly 12 and/or the mechanical joints 16 may incorporate a coupling member, e.g. a bolt, screw or the like, to hold the joint in a coupled position with the fixation locations of the roof assembly 12.

As discussed above, the sensor units 20 are able to be electrically connected to one or more electrical systems of the tractor 25. In the illustrated embodiment, this is provided by an electrical interface in the form of a connection cable 18 provided as part of the sensor assembly 10 and a corresponding socket (not shown) as part of the roof assembly 12 of the tractor 25. Furthermore, the cable 18 serves as both a data interface and a power interface for the sensor units 20, providing both a means to exchange data between the sensor units 20 and the electrical system(s) of the tractor 25, and a means to provide power to the sensor units 20, e.g. from a battery (not shown) of the tractor 25. It will be appreciated that in alternative arrangements two separate interfaces may be provided for a data and power connection, respectively.

Alternatively or additionally, the electrical interface can be integrated in at least one of the mechanical joints 16 or between the roof and the at least one mechanical joint 16. E. g, the mechanical joint 16 can enclose a connection cable to protect the electrical interface and/or the electrical cable against environmental impacts or cable break.

The sensor units 20 include one or more of: a camera; a LIDAR unit; a RADAR unit; an ultrasonic sensing unit; and an infrared sensor. The sensor assembly 10 may include one or more of multiple sensing unit types, which may include multiple sensor units of the same type. In the illustrated embodiment, the sensor units 20 are positioned about a perimeter of the enclosure 14. As will be appreciated, once installed on top of tractor 25, having the sensor units 20 positioned in this manner may provide sensing capabilities in all directions around the tractor 25.

As discussed above, the sensor assembly 10 includes one or more additional electrical components (not shown). These are provided within the enclosure 14 and are connectable to the electrical system(s) of the tractor 25 via the connection cable 18. The one or more additional electrical components may include a communication module, which may comprise part of a Global Navigation Satellite System (GNSS) for providing position information for the assembly 10 and tractor 25, one or more transmitter, receiver or transceiver components, including antenna(s), an electronic control unit (ECU), a lighting module including one or more light sources, and/or an audio unit including one or more speakers. Each of these additional electrical components may be provided to enhance one or more automated features for the tractor 25, for example.

Figure 2:
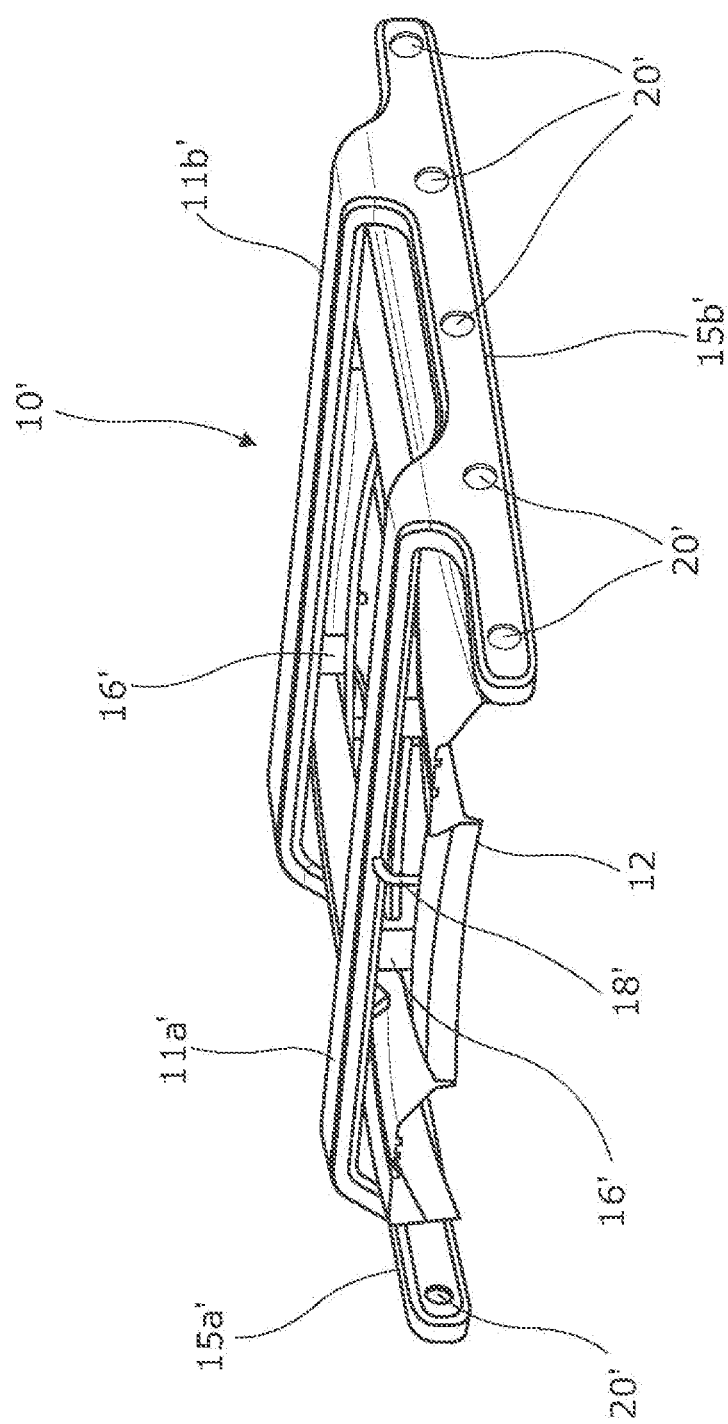
FIG. 2 is a perspective view of a second embodiment of a sensor assembly.

FIG. 2 illustrates a second embodiment of a sensor assembly 10'. Sensor assembly 10' is configured in a similar manner to sensor assembly 10 shown in FIGS. 1A and 1B, and like reference numerals have been used where like components are present. For instance, the sensor units 20', connection cable 18', additional electrical components and mechanical joints 16' are all configured in a similar manner to that described hereinabove.

Sensor assembly 10' differs in that the housing comprises a supporting frame formed of a pair of central members 11a', 11b' and a pair of side members 15a', 15b' defining a supporting structure on which the sensor units 20' are mounted. The mechanical joints 16' are provided as extensions of the central members 11a', 11b. Connection cable 18' extends from central member 11a'. The sensor units 20' are provided alongside side members 15a', 15b' and are positioned along respective sides of the roof assembly 12 of tractor 25.

Figure 3A:
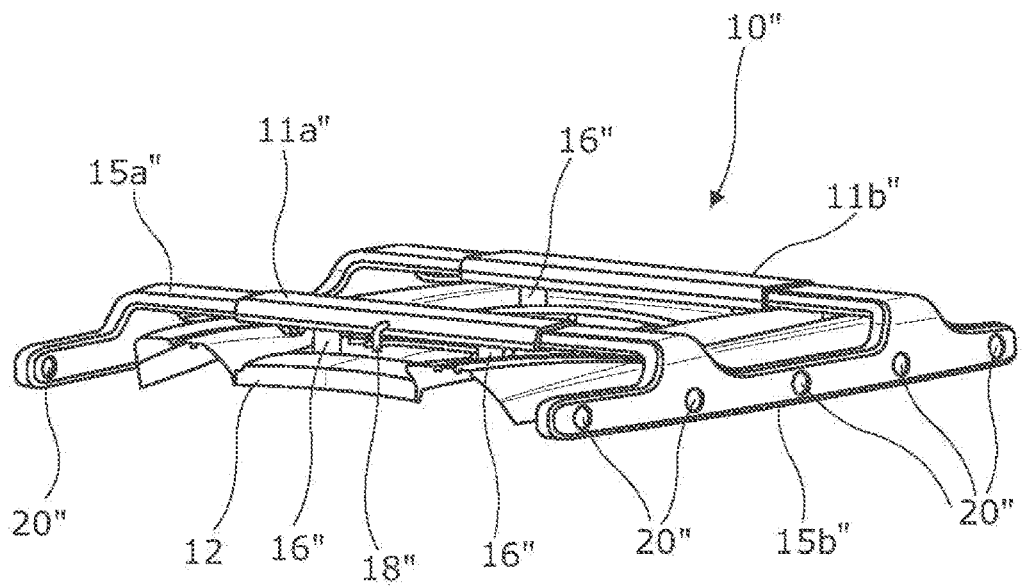
FIG. 3A is a perspective view of a third embodiment of a sensor assembly.
Figure 3B:
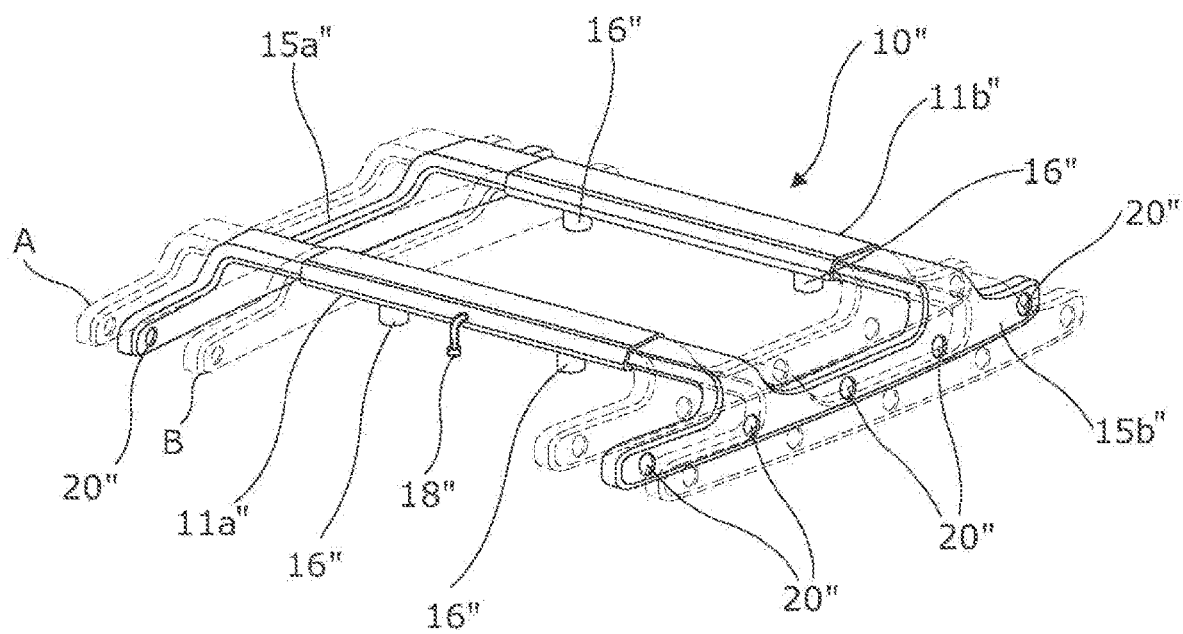
FIG. 3B is a further perspective view of the sensor assembly of FIG. 3A.

FIGS. 3A and 3B illustrate a third embodiment of a sensor assembly 10". Sensor assembly 10" is configured in a similar manner to sensor assembly 10' shown in FIG. 2, and like reference numerals have been used where like components are present. For instance, the sensor units 20", connection cable 18", additional electrical components and mechanical joints 16" are all configured in a similar manner to that described hereinabove.

The housing of sensor assembly 10" again comprises a supporting frame formed of a pair of central members 11a", 11b" and a pair of side members 15a", 15b" defining a supporting structure on which the sensor units 20" are mounted. Again, mechanical joints 16" are provided as extensions of the central members 11a", 11b", connection cable 18" extends from central member 11a" and the sensor units 20" are provided alongside side members 15a", 15b" and are positioned along respective sides of the roof assembly 12 of tractor 25.

Sensor assembly 10" differs in that the supporting frame is adjustable. Specifically, side members 15a", 15b" are provided in a sliding fit arrangement with the central members 11a", 11b" and may be moved outwardly and/or inwardly (with respect to one another) to adjust a width of the supporting frame of the sensor assembly 10". In this way, the sensor assembly 10" is able to be mounted on roof assemblies of differing widths. FIG. 3B illustrates maximum ("A") and minimum ("B") width extents for the side member 15a", showing the different roof assembly sizes which may be accommodated by sensor assembly 10".

Figure 4A:
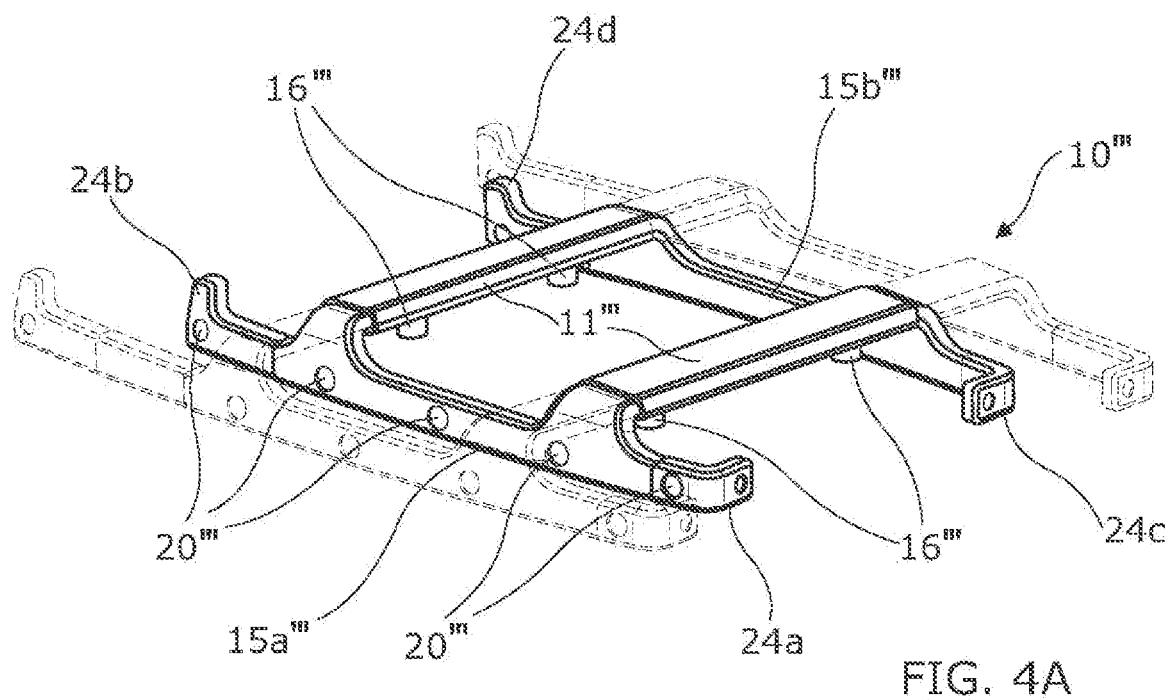
FIGS. 4A to 4C are a series of perspective views showing a fourth embodiment of a sensor assembly.
Figure 4B:
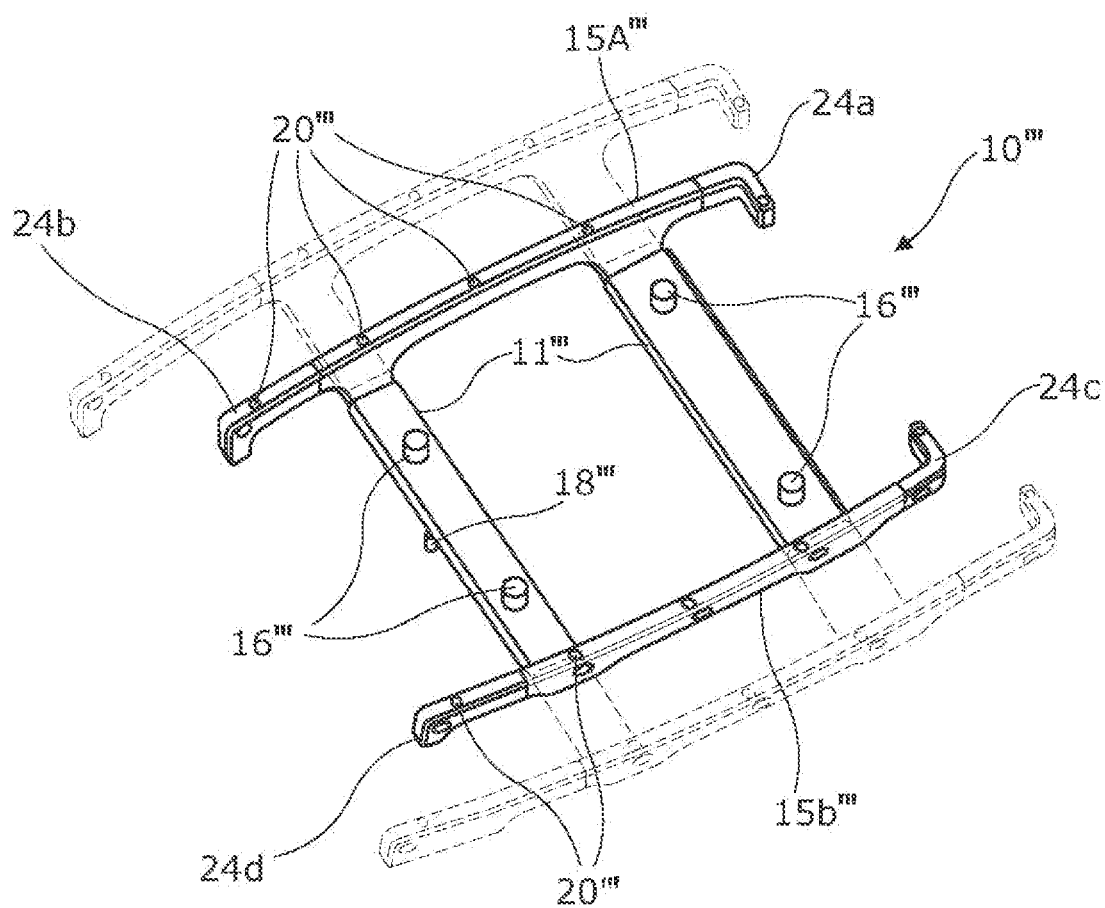
Figure 4C:
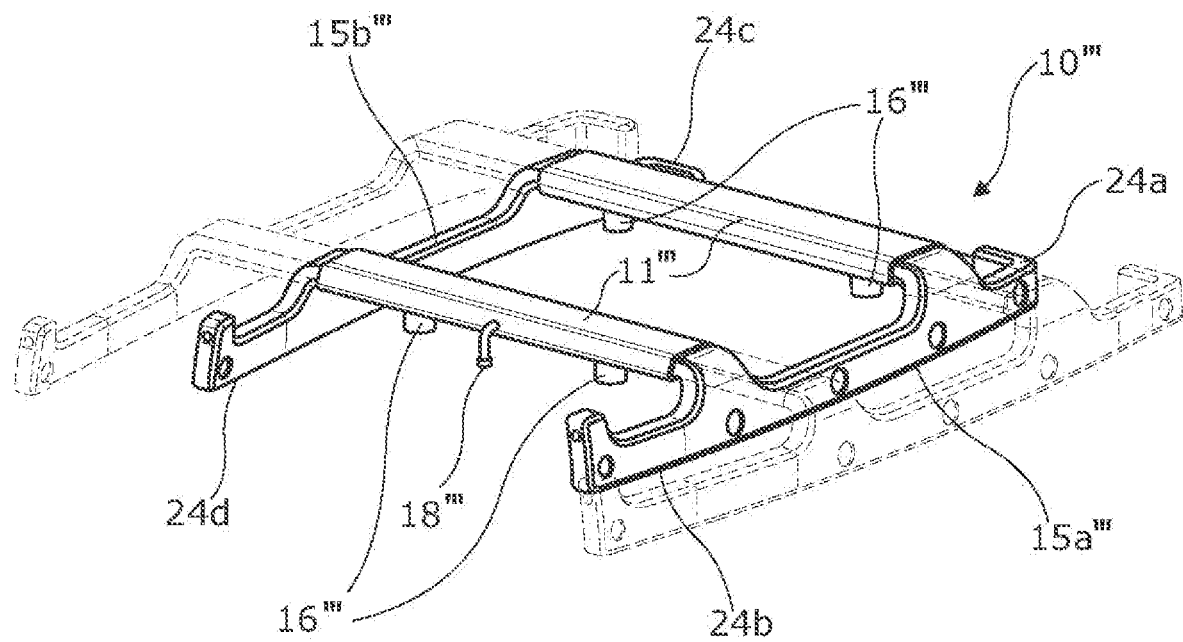

FIGS. 4A to 4C illustrate a fourth embodiment of a sensor assembly 10'''. Sensor assembly 10''' is configured in a similar manner to sensor assembly 10" shown in FIGS. 3A and 3B, and like reference numerals have been used where like components are present. For instance, the sensor units 20''', connection cable 18''', additional electrical components and mechanical joints 16''' are all configured in a similar manner to that described hereinabove.

The housing of sensor assembly 10''' again comprises a supporting frame formed of a pair of central members 11''' and a pair of side members 15a''', 15b''' defining a supporting structure on which the sensor units 20" are mounted. Again, mechanical joints 16''' are provided as extensions of the central members 11''', connection cable 18''' extends from a first central member 11''' and the sensor units 20''' are provided alongside side members 15a''', 15b''' and are positioned along respective sides of the roof assembly 12 of tractor 25.

Similarly, sensor assembly 10''', and specifically the supporting frame of the sensor assembly 10''' is adjustable. Again, side members 15a''', 15b''' are provided in a sliding fit arrangement with the central members 11''' and may be moved outwardly and/or inwardly (with respect to one another) to adjust a width of the supporting frame of the sensor assembly 10'''.

Sensor assembly 10''' differs in that end portions 24a, 24b, 24c, 24d are provided at the ends of respective side members 15a''', 15b''' of the supporting frame. The end portions 24a, 24b, 24c, 24d are moveable with respect to the respective side members 15a''', 15b''', here by rotating the end portions 24a, 24b, 24c, 24d about an axis running along the length of the side members 15a''', 15b'''. End portions 24a, 24c are angled with respect to the respective side members 15a''', 15b''' as shown in FIGS. 4A to 4C.

End portions 24a, 24b, 24c, 24d each include a respective sensor unit 20''' mounted therein, and as such rotation of the end portions 24a, 24b, 24c, 24d may be performed to adjust the position, angle etc. of the respective sensor units 20'''. This may advantageously allow for the respective sensor units 20''' to be positioned as required for a particular operation of the tractor 25, for instance.

The sensing units may additionally be provided with a positioning device, which in some examples may include an electronically controlled positioning device. This may be used to control the position and/or orientation of a sensing element of the respective sensor unit with respect to the housing, e.g. the enclosure 14 or supporting frame. This may advantageously provide further control over the position and/or orientation of the sensing units such that their position/orientation may be suited to a particular task being performed using the tractor 25, for example, or be positioned in a suitable manner for the specific agricultural vehicle 25 to which the sensor assembly 10 is mounted. In embodiments, the positioning device(s) can control the position of the sensing element in dependence on the type of agricultural work vehicle to which the sensor assembly is mounted, and this information can be received by an ECU of the sensor assembly 10 or individual ECU of the particular sensing unit 20 via the electrical interface. Alternatively, the arrangement may be configured in a manner to allow this information to be input manually by a user of the tractor 25, or example. Advantageously, the sensor assembly may be operable to automatically adjust the position of sensing element(s) of the one or more sensor units such that they are suitably positioned for a particular work vehicle type.

FIG. 5 illustrates tractor 25 with the sensor assembly 10'' mounted thereto. As discussed herein, mechanical joints 16'' are suitably located within corresponding fixation points on the roof assembly 12 of the tractor.

It will be appreciated that the above embodiments are discussed by way of example only. Various changes and modifications can be made without departing from the scope of the present disclosure.

The invention claimed is:

1. A sensor assembly for an agricultural work vehicle, the sensor assembly comprising:
    a housing;
    at least one sensor unit supported by the housing;
    at least one fixation point configured to couple the housing to a roof assembly of the agricultural work vehicle; and
    an electrical interface configured to provide an electrical connection between the at least one sensor unit and at least one electrical system of the agricultural work vehicle;
    wherein the housing comprises a supporting frame, wherein the frame comprises at least two parts that are moveable with respect to one another such that a linear dimension of the frame can be adjusted;
    wherein the supporting frame comprises a central portion with a pair of moveable side portions, and wherein the moveable side portions are engaged in a first sliding fit arrangement with the central portion to move relative to the central frame portion to adjust a width of the supporting frame;
    wherein at least one of the movable side portions comprises a main portion and an end portion, wherein the end portion is engaged in a second sliding fit arrangement with the main portion to move relative to the main portion in a direction substantially orthogonal to a movement direction of the first sliding fit arrangement.

2. The sensor assembly of claim 1, wherein the at least one sensor unit is movable with respect to the housing.

3. The sensor assembly of claim 2, wherein the at least one sensor unit is movable with at least two degrees of freedom.

4. The sensor assembly of claim 2, wherein the housing comprises a supporting frame, wherein the at least one sensor unit is mounted on a moveable part of the frame, and wherein the moveable part of the frame may be moved relative to at least one additional part of the frame to adjust a position of the at least one sensor unit.

5. The sensor assembly of claim 2, wherein the at least one sensor unit comprises a positioning device configured to control a position of a sensing element of the at least one sensor unit with respect to the housing.

6. An agricultural work vehicle comprising a roof assembly with the sensor assembly of claim 1 mounted thereto.

7. A sensor assembly for an agricultural work vehicle, the sensor assembly comprising:
    a housing;
    at least one sensor unit supported by the housing, wherein the at least one sensor unit is movable with respect to the housing;
    at least one fixation point configured to couple the housing to a roof assembly of the agricultural work vehicle; and
    an electrical interface configured to provide an electrical connection between the at least one sensor unit and at least one electrical system of the agricultural work vehicle;
    wherein the at least one sensor unit comprises a positioning device configured to control a position of a sensing element of the at least one sensor unit with respect to the housing, wherein the positioning device is configured to control the position of the sensing element in dependence on the type of agricultural work vehicle to which the sensor assembly is mounted, wherein information relating to the type of agricultural vehicle is determined in dependence on data received via the electrical interface.

8. The sensor assembly of claim 7, wherein the at least one sensor unit comprises at least one selected from the group consisting of a camera, a LIDAR unit, a RADAR unit, an ultrasonic sensing unit, and an infrared sensor.

9. The sensor assembly of claim 7, wherein the electrical interface comprises a data interface via which data may be exchanged between the at least one sensor unit and the at least one electrical system of the work vehicle.

10. The sensor assembly of claim 7, wherein the electrical interface comprises a power interface via which power may be provided to the at least one sensor unit from a power source associated with the work vehicle.

11. The sensor assembly of claim 7, wherein the electrical interface comprises both a data interface and a power interface.

12. The sensor assembly of claim 7, further comprising at least one additional electrical component connectable to the at least one electrical system of the work vehicle, the at least one additional electrical component comprising at least one unit selected from the group consisting of a communication module, a transmitter component, a receiver component, a transceiver component, an electronic control unit (ECU), a lighting module, and an audio unit.

13. The sensor assembly of claim 12, wherein the housing defines an enclosure, and wherein at least one of the at least one sensor unit and the at least one additional electrical component is within the enclosure.

14. The sensor assembly of claim 7, wherein the housing comprises a supporting frame.

15. The sensor assembly of claim 14, wherein the supporting frame is adjustable.

16. The sensor assembly of claim 15, wherein the supporting frame is adjustable to adjust a distance between each of at least two fixation points.

17. The sensor assembly of claim 14, wherein the frame comprises at least two parts that are moveable with respect to one another such that a linear dimension of the frame can be adjusted.

18. The sensor assembly of claim 17, wherein the supporting frame comprises a central portion with a pair of moveable side portions, and wherein the moveable side portions are engaged in a first sliding fit arrangement with the central portion to move relative to the central frame portion to adjust a width of the supporting frame.

19. The sensor assembly of claim 7, wherein an operating characteristic of the at least one sensor unit is adjustable in dependence on the type of agricultural work vehicle to which the sensor assembly is mounted.

20. The sensor assembly of claim 19, wherein the operating characteristic comprises at least one selected from the group consisting of:
selection of a sensor filter;
activation of the at least one sensor;
deactivation of the at least one sensor;
adjustment of a field of view of the at least one sensor; and
adjustment of optics of the camera.

21. The sensor assembly of claim 14, wherein an operating characteristic of the at least one additional electrical component is adjustable in dependence on the type of agricultural vehicle to which the sensor assembly is mounted.

22. An agricultural work vehicle comprising a roof assembly with the sensor assembly of claim 7 mounted thereto.

23. The sensor assembly of claim 7, wherein the electrical interface comprises a single interface configured to provide both a data connection and a power connection between the at least one sensor unit and the at least one electrical system of the work vehicle.

24. A sensor assembly for an agricultural work vehicle, the sensor assembly comprising:
a housing;
at least one sensor unit supported by the housing, wherein the at least one sensor unit is movable with respect to the housing;
at least one fixation point configured to couple the housing to a roof assembly of the agricultural work vehicle; and
an electrical interface configured to provide an electrical connection between the at least one sensor unit and at least one electrical system of the agricultural work vehicle;
wherein the at least one sensor unit comprises a positioning device configured to control a position of a sensing element of the at least one sensor unit with respect to the housing, wherein the positioning device is configured to control the position of the sensing element in dependence on the type of agricultural work vehicle to which the sensor assembly is mounted, and wherein information relating to the type of agricultural vehicle is determined in dependence on a manual input by a user of the vehicle.

* * * * *